United States Patent [19]
Mori

[11] 3,888,237
[45] June 10, 1975

[54] PH-MEASURING DEVICE USED IN AN ENDOSCOPE

[75] Inventor: Toshiyuki Mori, Tokyo, Japan

[73] Assignee: Olympus Optical Co., Ltd., Tokyo, Japan

[22] Filed: Oct. 15, 1973

[21] Appl. No.: 406,292

[52] U.S. Cl. .................. 128/2 E; 128/6; 128/8; 204/195 B
[51] Int. Cl. .................................................. A61b 5/05
[58] Field of Search ............ 128/2 E, 2.1 E, 6, 8; 204/195 B, 195 G

[56] References Cited
UNITED STATES PATENTS

| | | | |
|---|---|---|---|
| 3,294,085 | 12/1966 | Wallace | 128/6 |
| 3,547,794 | 12/1970 | Nishimoto | 128/2.1 E |
| 3,643,653 | 2/1972 | Takahashi | 128/6 |
| 3,703,169 | 11/1972 | Ouchi | 128/6 |
| 3,799,150 | 3/1974 | Bonnet | 128/6 |

*Primary Examiner*—Kyle L. Howell
*Attorney, Agent, or Firm*—Flynn & Frishauf

[57] ABSTRACT

In an endoscope provided with a channel permitting the passage of forceps, a device to measure the PH of an abdominal liquid which comprises a glass electrode brought into contact with an abdominal liquid to measure its PH; a thin flexible tube fitted at one end to the glass electrode to bring said electrode to the desired abdominal liquid whose PH is to be measured and a lead having one end connected to the glass electrode and the opposite end extended to the outside through the flexible tube.

6 Claims, 5 Drawing Figures

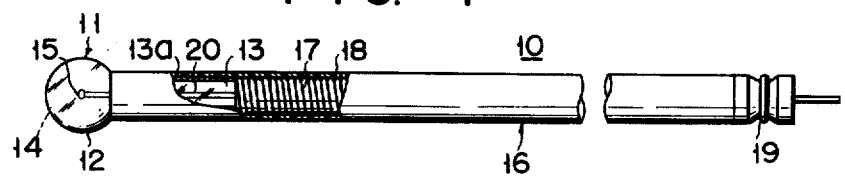
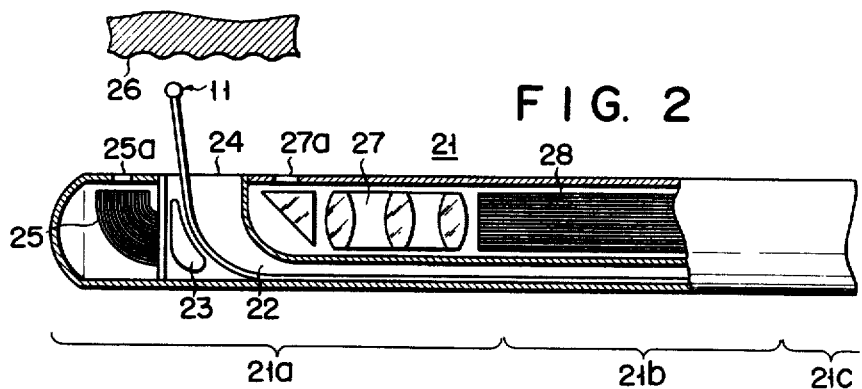
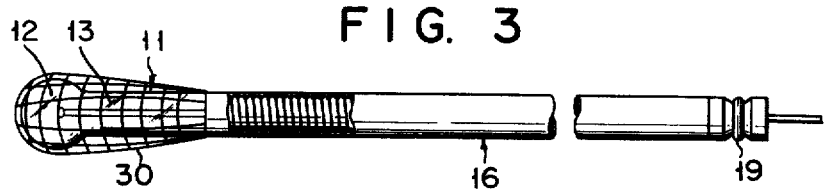
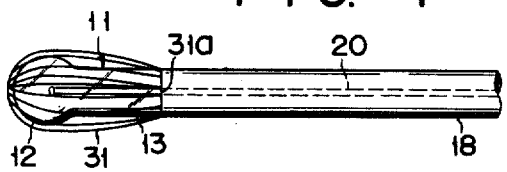

PH-MEASURING DEVICE USED IN AN ENDOSCOPE

BACKGROUND OF THE INVENTION

This invention relates to a PH-measuring device, and more particularly to a device for measuring the PH of a liquid present in the prescribed part of a living body.

Various types of PH-measuring device have already been developed. Among those types, the one using a glass electrode is known to measure PH most accurately. This glass electrode type apparatus has a thin-walled PH-measuring glass sphere reacting with a liquid having a given PH. This sphere is fitted to the end of a glass tube of sufficiently high chemical resistance to make no reaction with any such liquid. The glass sphere is fitted with a solution of electrolyte having a high buffer value. A reference electrode is inserted into this glass sphere. When the glass sphere is placed in an object liquid, then the potential of the glass electrode varies with the PH of the liquid. Measurement of the changed potential of the glass electrode indicates the PH of the liquid.

Measurement of the PH of a liquid present in a living body, for example, a gastric juice oozing from the inner walls of the stomach has customarily been effected by sampling the gastric juice with a catheter placed in the stomach. The PH of the gastric juice thus collected has hitherto been determined by a PH-measuring device using, for example, the above-mentioned glass electrode type apparatus.

However, the prior art PH-measuring process has presented difficulties in accurately determining the PH of a gastric juice leaking from any affected part of the stomach, because a gastric juice collected from the stomach is actually a mixture of juices drawn from both the affect and other parts of the stomach. Moreover, insertion of a catheter into the stomach for collection of a gastric juice demanded a patient to take a forced posture for a long time and subjected him to a great deal of pain. The results of diagnosis could not be clearly confirmed until the PH of the gastric juice collected was measured, thus rendering the diagnosis a time-consuming work.

SUMMARY OF THE INVENTION

It is accordingly the object of this invention to provide a PH-measuring device capable of accurately indicating the PH of a juice oozing from the affected part of a patient by a simple operation without imparting any pain to him.

The PH-measuring device of this invention is combined with a known endoscope provided with a forceps channel and comprises a PH-measuring glass electrode brought into contact with an object whose PH is to be measured, and an elongated flexible tube inserted into the forceps channel of the endoscope to bring the glass electrode to the object whose PH is to be measured.

BRIEF DESCRIPTION OF THE DRAWING

FIG. 1 is a side view, partly in section, of a PH-measuring device according to an embodiment of this invention;

FIG. 2 is a longitudinal sectional view of the PH measuring device of FIG. 1 used in an endoscope;

FIG. 3 is a side view, partly in section, of a PH-measuring device according to another embodiment of the invention; and FIGS. 4 and 5 are side views of modifications of the PH-measuring device of the invention.

DESCRIPTION OF THE PREFERRED EMBODIMENTS

There will now be described by reference to FIGS. 1 and 2 a PH-measuring device according to an embodiment of this invention.

Referring to FIG. 1, reference numeral 10 denotes the present PH-measuring device including a known PH-measuring glass electrode 11. This glass electrode 11 includes a thin-walled PH-measuring glass sphere 12 capable of indicating a potential corresponding to the PH of an abdominal juice with which it is brought into contact and a glass tube 13 presenting sufficiently high chemical resistance to make no reaction with any abdominal juice having a given PH and connected at one end to the glass sphere 12. The glass sphere 12 is fitted with a solution of electrolyte 14 having a high buffer value, for example, a solution of potassium chloride. Further inserted into the glass sphere 12 is a reference electrode 15 to be immersed in the above-mentioned electrolyte solution 14. The glass tube 13 of high chemical resistance is covered with a protective envelope 13a having its peripheral surface formed of synthetic resin or metal, so that the glass tube 13 may be protected from any damage due to the tube 13 striking the inner wall of a forceps channel and a forceps raising mechanism of an endoscope. The base end of the glass tube 13 is connected liquid-tight to one end of an operative narrow flexible tube 16. This flexible tube 16 has an elongated flexible closely-wound coil 17 and a thin-walled synthetic resin 18 covering the surface of the coil 17 in coaxial relationship therewith. The flexible tube 16 is coaxially penetrated by a lead 20 electrically connected at one end to the reference electrode 15 and at the other end to an external terminal 19.

There will now be described by reference to FIG. 2 the case where the PH-measuring device 10 of this invention constructed as mentioned above is inserted, for example, into the stomach to measure the PH of a gastric juice leaking from the particular or affected part of the inner walls of the stomach.

An endoscope 21 is formed, as is well known, of a distal end portion 21a, bending section 21b and flexible tube 21c. The distal end portion 21a of the endoscope 21 is first brought to the desired interior part of the stomach. Then, the PH-measuring device 10 is introduced into the forceps channel 22 provided in the endoscope 21 through the control unit (not shown) of the endoscope 21 with the glass electrode 11 of the PH-measuring device 10 kept on the forward side. The glass electrode 11 is projected through a forceps opening 25 by operation of a forceps raising mechanism 23 disposed in the distal end portion 21a of the endoscope 21. While the affected part 26 of the stomach is illuminated through an illumination window 25a and visually examined through an observation window 27a, the glass electrode 11 is pressed against the affected part 26. The illumination window 25a is provided in the distal end portion 21a of the endoscope. Light is supplied from an external source through a light guide 25 and then conducted through the illumination window 25a to the affected part 26. An observation window 27a is optically connected to an image guide 28 constructed by a prism and lenses, thereby permitting observation of the whole view through an eyelens (not shown) received in the control unit of the endoscope.

When the PH-measuring glass sphere 12 abuts against the affected part 26, then the reference electrode will reach a potential corresponding to the PH of an object juice collected in the affected part 26. This potential is detected at the terminal 19 through the lead 20. If, therefore, the terminal 19 is fitted in advance with a prescribed meter (not shown) for indicating varying potentials in the form of PH values, then the PH of the liquid collected in the affected part 26 can be directly read.

The PH-measuring device according to the foregoing embodiment enables the PH of a liquid collected in an affected part in the abdominal cavity of a living body, for example, a gastric juice oozing from the stomach to be directly measured without sampling it, thereby attaining the quick accurate determination of the PH value of an object liquid. Moreover, the glass electrode of the present PH-measuring device is fitted to one end of a flexible member, making the device as a whole look like forceps. Accordingly, the device can be easily inserted into the abdominal cavity in the same manner as when ordinary forceps are conducted into an endoscope.

Referring to FIG. 3 showing a modification of the present PH-measuring device, the PH-measuring glass sphere 12 and glass tube 13 are covered with a bag-shaped net 30 prepared by knitting a metal wire into a lattice form.

In the modification of FIG. 4, a plurality of metal wires are arranged along the length of the glass electrode 11 so as to surround the glass sphere 12 and glass tube 13. The metal wires are converged at one end on the top of the glass sphere 12 and at the other end fitted to an annular wire 31a provided at the base of the glass tube 13 so as to act as a covering 31 for protection of the glass electrode 11.

In the modification of FIG. 5, the glass electrode 11 is protected by a covering 32 bored with many holes.

The coverings of FIGS. 3 to 5 do not obstruct at all the detection of the PH of an abdominal liquid by contact of the glass sphere 12 of the glass electrode 11 with said liquid, but prevents the glass sphere 12 from being broken by striking against the forceps raising mechanism and the inner wall of the forceps channel 22 of an endoscope.

In the embodiment of FIG. 1, the elongated flexible member 16 included a closely wound coil 17 and a narrow plastic tube 18 with a lead 20 inserted therethrough. As in FIG. 4, however, it is possible to eliminate the closely wound coil 17 and insert the lead 20 into the narrow plastic tube 18. Conversely, as in FIG. 5, the lead 20 may be put into the closely wound coil 17 and the narrow plastic tube 18 may be omitted.

What is claimed is:

1. In an endoscope provided with an elongated forceps channel (22), a PH-measuring device (10) comprising:
   an elongated flexible tubular member (16) including an elongated flexible tube (18) and an elongated flexible tubular metal coil (17) extending along and in the flexible tube (18), said tubular member (16) being inserted into the elongated forceps channel (22) and extendable at one end into a body cavity;
   a glass electrode (11) coupled to said one end of the elongated tubular metal coil (17) so as to be extendable into a body cavity and adapted to contact with matter in said body to indicate a potential corresponding to the PH of said body matter which is to be examined; and
   an elongated electrical lead (20) passing through said elongated tubular metal coil (17) and connected at one end to the glass electrode (11) and at the other end adapted to be connected to an external potential measuring device through the flexible tubular member (16).

2. Apparatus according to claim 1 wherein said flexible tube is made of soft material.

3. Apparatus according to claim 1 wherein the glass electrode is wrapped in a protective covering bored with a large number of through holes.

4. Apparatus according to claim 3 wherein the covering is a metal net.

5. Apparatus according to claim 1 wherein the glass electrode includes a PH-measuring glass sphere filled with a solution of electrolyte, a glass tube connected at one end to the glass sphere and at the other end to the elongated flexible tubular member and a reference electrode immersed in the electrolyte solution filled in the glass sphere and directly connected to the electrical lead.

6. Apparatus according to claim 5 which further comprises a protective tube surrounding the glass tube for its protection.

* * * * *